(12) United States Patent
Quennehen et al.

(10) Patent No.: US 11,542,827 B2
(45) Date of Patent: Jan. 3, 2023

(54) METHOD FOR ASSEMBLING AND DISASSEMBLING A TURBINE RING ASSEMBLY

(71) Applicant: SAFRAN AIRCRAFT ENGINES, Paris (FR)

(72) Inventors: Lucien Henri Jacques Quennehen, Moissy-Cramayel (FR); Antoine Claude Michel Etienne Danis, Moissy-Cramayel (FR); Hubert Jean-Yves Illand, Moissy-Cramayel (FR); Clément Jarrossay, Moissy-Cramayel (FR); Nicolas Paul Tableau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 1 day.

(21) Appl. No.: 17/421,071

(22) PCT Filed: Jan. 8, 2020

(86) PCT No.: PCT/HR2020/050025
§ 371 (c)(1),
(2) Date: Jul. 7, 2021

(87) PCT Pub. No.: WO2020/144435
PCT Pub. Date: Jul. 16, 2020

(65) Prior Publication Data
US 2022/0098994 A1    Mar. 31, 2022

(30) Foreign Application Priority Data
Jan. 8, 2019 (FR) ..................... 1900154

(51) Int. Cl.
*F01D 11/12* (2006.01)
*F01D 25/24* (2006.01)
*F01D 25/28* (2006.01)

(52) U.S. Cl.
CPC ............ *F01D 11/12* (2013.01); *F01D 25/246* (2013.01); *F01D 25/285* (2013.01);
(Continued)

(58) Field of Classification Search
CPC ... B23P 11/00; B23P 11/02; F05D 2300/6033; F05D 2260/31; F05D 2260/37;
(Continued)

(56) References Cited

U.S. PATENT DOCUMENTS

| 2012/0027572 A1 | 2/2012 | Denece et al. |
| 2012/0082540 A1 | 4/2012 | Dziech et al. |
| 2014/0271145 A1 | 9/2014 | Thomas et al. |

FOREIGN PATENT DOCUMENTS

| EP | 1350927 A2 | 10/2003 |
| FR | 2540939 A1 | 8/1984 |

(Continued)

OTHER PUBLICATIONS

International Search Report in International Application No. PCT/FR2020/050025, dated May 19, 2020 (2 pages).
(Continued)

*Primary Examiner* — Moshe Wilensky
(74) *Attorney, Agent, or Firm* — Bookoff McAndrews, PLLC

(57) ABSTRACT

A method for assembling/disassembling a turbine ring assembly including a turbine ring of ceramic matrix composite material and a ring support structure of metal equipped with a central shroud and with at least one single-piece annular plate positioned upstream of the ring with respect to the direction of an air flow passing through the
(Continued)

assembly, the plate having in the radial direction a first free end and a second end opposite to the first end, the second end being removably attached to the first radial flange and shrink-fit to the central shroud, is disclosed. The method for assembling/disassembling includes, before the assembling/disassembling of the plate, a step of deformation of the central shroud and/or of the at least one annular plate.

11 Claims, 9 Drawing Sheets

(52) U.S. Cl.
CPC ...... *F05D 2220/32* (2013.01); *F05D 2230/60* (2013.01); *F05D 2230/70* (2013.01); *F05D 2240/11* (2013.01)

(58) Field of Classification Search
CPC ............. F05D 2230/60; F05D 2230/70; F05D 2220/32; F05D 2240/11; F01D 25/246; F01D 25/285; F01D 11/12; F01D 11/122
See application file for complete search history.

(56) References Cited

FOREIGN PATENT DOCUMENTS

| | | |
|---|---|---|
| FR | 2955898 A1 | 8/2011 |
| GB | 2480766 A | 11/2011 |
| WO | 2006136755 A2 | 12/2006 |
| WO | 2018172654 A1 | 9/2018 |
| WO | 2018172655 A1 | 9/2018 |

OTHER PUBLICATIONS

French Search Report in French Patent Application No. 1900154, dated Sep. 24, 2019 (2 pages).

METHOD FOR ASSEMBLING AND DISASSEMBLING A TURBINE RING ASSEMBLY

CROSS-REFERENCE TO RELATED APPLICATION(S)

This application is the U.S. national phase entry under 35 U.S.C. § 371 of International Application No. PCT/FR2020/050025, filed on Jan. 8, 2020, which claims priority to French Patent Application No. 1900154, filed on Jan. 8, 2019.

TECHNICAL FIELD

The invention relates to a turbine ring assembly comprising a plurality of ring sectors of ceramic matrix composite material, as well as a ring support structure, and more particularly a method for assembling and disassembling a turbine ring assembly.

The field of application of the invention is in particular that of aeronautical gas turbine engines. The invention is applicable, however, to other turbomachines, for example industrial turbines.

PRIOR ART

In the case of entirely metallic turbine ring assemblies, it is necessary to cool all the elements of the assembly and in particular the turbine ring, which is subjected to the hottest gas flows. This cooling has a significant impact on the performance of the engine, because the cooling flow used is extracted from the main flow of the engine. In addition, the use of metal for the turbine ring limits the possibilities of increasing the temperature at the turbine, which would however allow improving the performance of aeronautical engines.

In order to attempt to solve these problems, producing ring sectors of ceramic matrix composite (CMC) materials has been contemplated.

CMC materials have good mechanical properties, which make them suitable for constituting structural elements, and advantageously retain these properties at high temperatures. The use of CMC materials has advantageously allowed reducing the cooling flow to be imposed during operation and therefore improving the performance of turbomachines. In addition, the use of CMC materials advantageously allows reducing the mass of the turbomachines and reducing the effect of hot dilation encountered with metallic parts.

However, proposed existing solutions can implement an assembling of a CMC ring sector with metal fastening parts to a ring support structure, these fastening parts being subjected to the hot gas flow. Consequently, these metal fastening parts undergo hot dilation which can lead to mechanical stressing of the CMC ring sectors and to weakening of the latter.

Known furthermore are documents FR 2 540 939, GB 2 480 766, EP 1 350 927, US 2014/0271145, US 2012/082540 and FR 2 955 898, which disclose turbine ring assemblies.

There exists a need to improve the assembling/disassembling of existing turbine ring assemblies, and in particular existing turbine ring assemblies comprising a CMC material in order to reduce the intensity of the mechanical stresses to which the CMC ring sectors are subjected during the operation of the turbine.

It is known to use a turbine ring assembly including a CMC ring and a metallic ring support structure, the ring support structure comprising, among other things, a central shroud from which extend a downstream radial flange and an upstream radial flange, between which is held the ring and an annular turbine plate shrink-fit on the central shroud upstream of the upstream radial flange.

This shrink fit allows retaining a radial contact between the central shroud and the annular plate so as to ensure radial contact at all operating points and thus allow good radial positioning.

However, this shrink fit possibly being relatively large from a few thousandths of a millimeter to a millimeter in diameter), it can cause problems during the assembling or the disassembling of the ring. In fact, due to the low mechanical permissible CMC ring with and its fastening technology, it is necessary to be able to slide the annular plates into the casing in a controlled manner. The more so since assembling and disassembling are necessary for performing inspections, for example within the scope of a test, or for replacing parts when the ring assembly is in service on an aircraft.

It is impossible, with the stresses exerted by the shrink fit, to push or pull the parts to assemble them or to extract them as it is done conventionally. In fact, in an assembly configuration of this type, directly pushing or pulling the parts would be a source of wear, of scratches or of deformation which would then generate an unacceptable situation.

DISCLOSURE OF THE INVENTION

The invention aims to propose a method for assembling or disassembling a turbine ring assembly allowing dispensing with the stresses linked to the shrink fit of the at least one plate to the central shroud of a ring support structure of a turbine ring assembly, the turbine ring assembly allowing the retention of each ring sector deterministically, i.e. holding its position and avoiding having it vibrate, on the one hand, while allowing the ring sector, and by extension the ring, to deform under the influence of temperature increases and pressure variations, and this in particular independently of the interface metallic parts, on the one hand, while improving sealing between the sector outside the stream and the stream sector, particularly the sealing of the cavity situated at the radially upper part of the ring. All this while simplifying the manipulations and while reducing their number for the assembling of the ring assembly.

One object of the invention proposes a method for assembling a turbine ring assembly comprising a turbine ring of ceramic matrix composite material and a ring support structure of metal equipped with a central shroud from which protrude a first and a second radial flange, from which the ring is held, and with at least one single-piece annular plate positioned upstream of the turbine ring and of the first radial flange with respect to the direction of an air flow intended to pass through the turbine ring assembly, said at least one annular plate having, in the radial direction, a first free end and a second end opposite to the first end, said second end being, on the one hand, removably attached to said first radial flange and, on the other hand, shrink-fit to the central shroud of the ring support structure.

According to a general feature of the invention, the method for assembling comprises, prior to the assembling of said at least one annular plate to the ring support structure, a step of radial deformation of the ring support structure by heating the central shroud and/or by cooling said at least one plate, then a step of insertion of said at least one plate on the ring support structure.

The heating of the external shroud allows radially dilating the central shroud to generate a clearance between the annular plate and the radially internal surface of the central shroud, then a step of insertion of said at least one plat on the ring support structure.

According to a first aspect of the method for assembling, the heating step can be maintained until the temperature of the central shroud is greater than or equal to 30° C., and preferably greater than or equal to 50° C.

According to a second aspect of the method for assembling, the heating step can comprise an application of a heating blanket surrounding the entire circumferential perimeter of the radially external surface of the central shroud.

The use of a heating blanket allows inflating the central shroud homogeneously without requiring more than one operator, unlike the use of heaters which have the defect of mobilizing a large number of operators and generating a non-homogeneous deformation, the heaters being heating devices blowing a stream of hot air.

Likewise, the use of blowtorches has the disadvantage of causing local overheating which damage the CMC microstructure of the ring.

According to a third aspect of the method for assembling, the method can further comprise, prior to the assembling of said at least one annular plate on the ring support structure, a step of cooling said at least one annular plate in order to obtain a shrinkage of said at least one annular plate.

The cooling of said at least one annular plate prior to assembling allows reducing the amount of radial dilation of the central shroud necessary for assembling and therefore reducing the temperature to which the casing needs to be heated.

According to a fourth aspect of the method, the cooling step can comprise the application of dry ice on said at least one plate so as to obtain a shrinkage of the plate(s).

In one variant, the cooling step can comprise the application of forced convection by means of a fan aimed at said at least one plate so as to obtain a shrinkage of the plate(s).

According to a fifth aspect of the method for assembling, the assembling of the ring assembly can be accomplished in the vertical position with respect to the ground, i.e. with the turbine ring and the ring support structure in a position where the axial direction of the ring is congruent with the vertical position.

When the method for assembling comprises a step of cooling with dry ice, this position allows simple placement of the dry ice on the plates, the dry ice being held in position by gravity.

Another object of the invention proposes a method for disassembling a turbine ring assembly comprising a turbine ring of ceramic matrix composite material and a ring support structure of metal equipped with a central shroud from which protrude a first and a second radial flanges from which the ring is held, and with at least one single-piece annular plate positioned upstream of the turbine ring and of the first radial flange with respect to the direction of an air flow intended to pass through the turbine ring assembly, said at least one annular ring having, in the radial direction, a first free end and a second end opposite to the first end, said second end being, on the one hand, removably attached to said first radial flange and, on the other hand, shrink-fit to the central shroud of the ring support structure.

According to a general feature of the invention, the method for disassembling comprises, prior to the disassembling of said at least one annular plate of the ring support structure, a step of radial deformation of the ring support structure by heating the central shroud and/or by cooling said at least one plate, then a step of extraction of said at least one plate of the ring support structure.

The heating of the external shroud allows dilating radially the central shroud to generate a clearance between the annular plate and the radially internal surface of the central shroud, and thus disassembling the plate more easily from the central shroud.

According to a first aspect of the method for disassembling, the heating step is maintained until the temperature of the central shroud is greater than or equal to 50° C., and preferably greater than or equal to 170° C.

For disassembling, the technique employed is the same as for assembling. It is necessary, however, to heat more vigorously. In fact, during assembling, the plates not being in contact with the casing, i.e. with the external shroud of the support structure, there is no exchange of thermal flux, therefore no dilation of the plate(s) when the casing is heated.

On the other hand, once the plate(s) is(are) assembled, as there is contact, when the casing is heated, the plate(s) are also heated. However, due to the phenomenon of thermal resistance at the contact, the plate(s) are heated less than the casing.

Calculations have shown that heating the casing to 50° C. would allow effortless extraction.

According to a second aspect of the method for disassembling, the heating step comprises an application of a heating blanket surrounding the entire circumferential perimeter of the radially external surface of the central shroud.

According to a third aspect of the method for disassembling, the method further comprises, simultaneously with the step of heating the central shroud, a step of cooling said at least one annular plate.

The cooling of the annular plate during the heating of the central shroud allows reducing the temperature to which the central shroud must be heated to allow the disassembling of said at least one annular plate of the central shroud, and therefore reducing the risk of burns.

According to a fourth aspect of the disassembling, the cooling step comprises the application of forced convection by means of a fan aimed at said at least one plate.

According to a fifth aspect of the method for disassembling, the cooling step comprises the application of dry ice to said at least one plate so as to obtain a shrinkage of the plate.

According to a sixth aspect of the method for disassembling, the disassembling of the ring can be accomplished in the vertical position with respect to the ground, i.e. with the turbine ring and the ring support structure in a position where the axial direction of the ring is congruent with the vertical direction.

The vertical direction is defined with respect to gravity. The vertical direction corresponds to the direction of the force of gravity.

When the method for disassembling comprises a step of cooling with dry ice, this position allows the dry ice to be simply placed on the plates, the dry ice being held in position by gravity.

According to a fifth aspect of the method for disassembling, the step of extraction of said at least one plate comprises attachment of a plurality of first fine-pitched screws into the tapped openings of said at least one plate, the first screws being integral with an extraction plate, then the support of the second screws against a portion of the ring support structure distinct from said at least one plate, the second screws being engaged with the tapped openings of the extraction plate, then the activation of the second screws to move the extraction plate away from the ring support structure and to extract said at least one plate from the ring support structure.

The use of extraction tooling of this type allows avoiding having an operator burned during extraction.

BRIEF DESCRIPTION OF THE DRAWINGS

The invention will be better understood upon reading the text hereafter, by way of non-limiting indication, with reference to the appended drawings in which.

DESCRIPTION OF THE EMBODIMENTS

Figure 1:
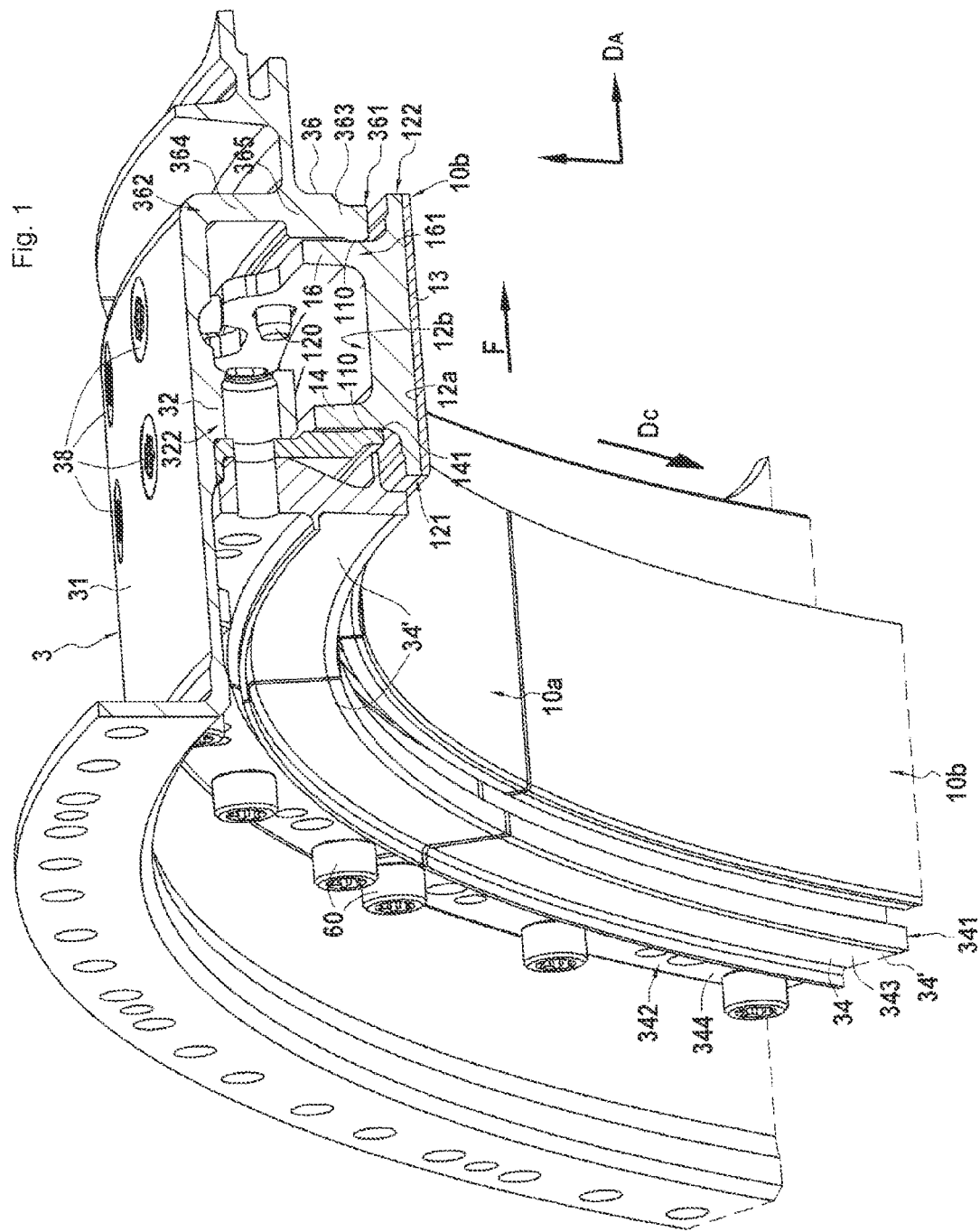
FIG. 1 is a perspective schematic view of a first embodiment of a turbine ring assembly according to the invention.

FIG. 1 shows a high-pressure turbine ring assembly comprising a turbine ring 1 of ceramic matrix composite (CMC) material and a metallic ring support structure 3. The turbine ring 1 surrounds a set of rotating blades (not shown). The turbine ring 1 is formed of a plurality of ring sectors 10, FIG. 1 being a view in radial section. The arrow $D_A$ indicates the axial direction of the turbine ring 1, while the arrow $D_R$ indicates the radial direction of the turbine ring 1 and the arrow $D_C$ indicates the circumferential direction of the turbine ring 1. For the sake of simplifying the presentation, FIG. 1 is a partial view of the turbine ring 1 which in reality is a complete ring.

Figure 2:
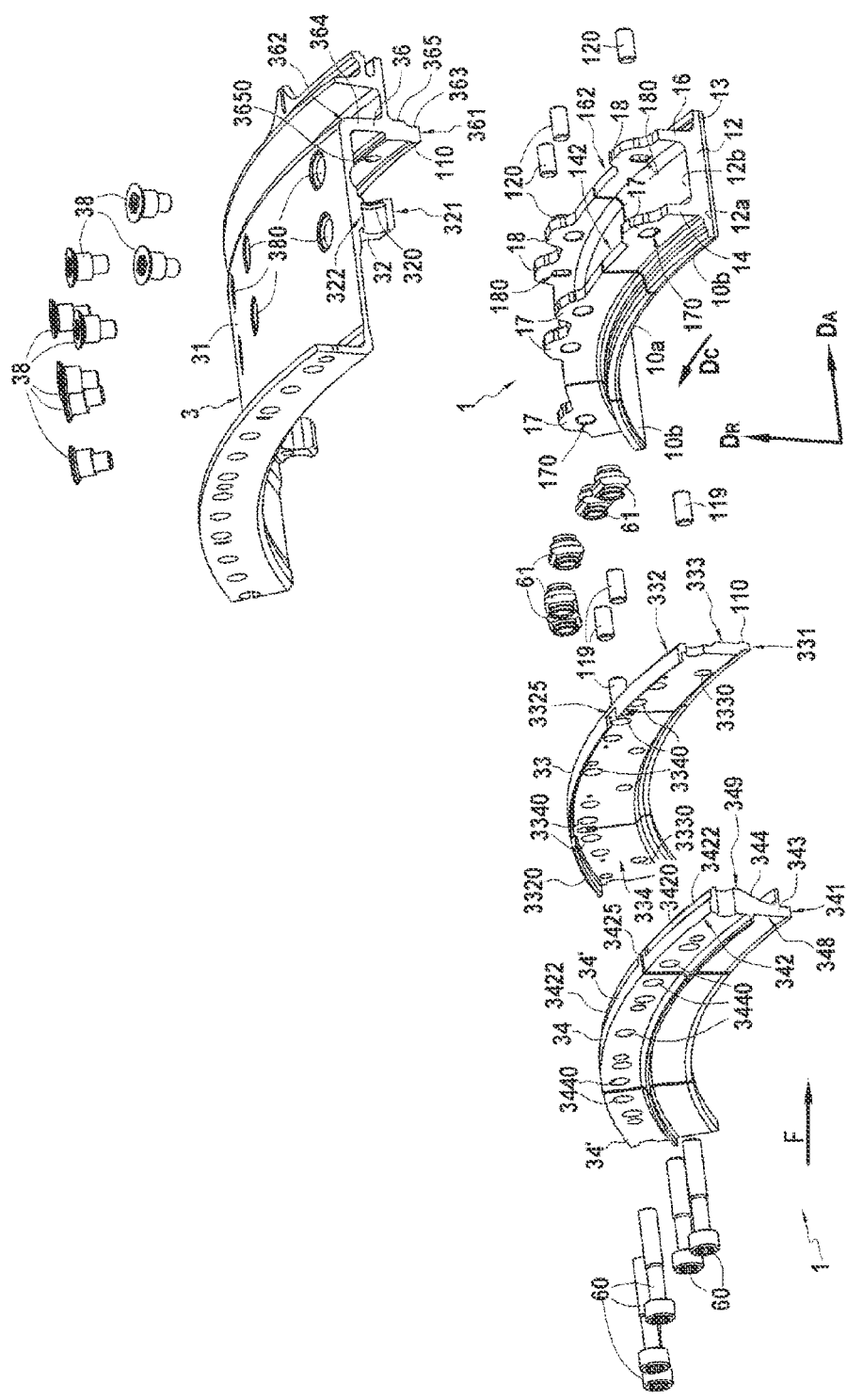
FIG. 2 is a perspective schematic view of the turbine ring assembly of FIG. 1.
Figure 3:
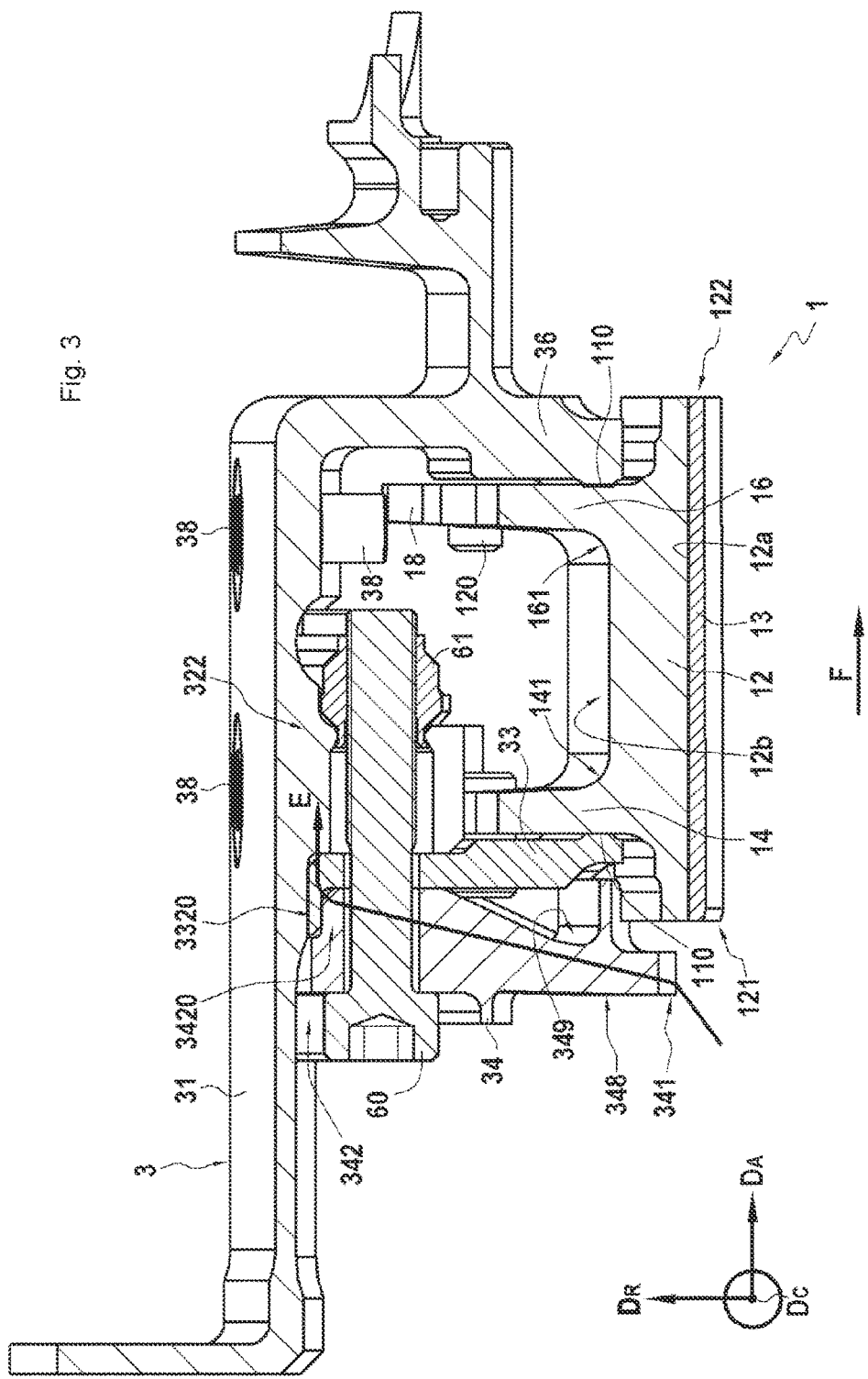
FIG. 3 is a schematic section view of the turbine ring assembly of FIG. 1.

As illustrated in FIGS. 2 and 3 which respectively present a schematic exploded perspective view and a section view of the turbine ring assembly of FIG. 1, the section view being along a section plane comprising the radial direction $D_R$ and the axial direction $D_A$ and orthogonal to the circumferential direction $D_C$, each ring sector 10 has, in a plane defined by the axial $D_A$ and radial $D_R$ directions, a cross section substantially in the shape of the inverted Greek letter π. In fact, the cross section comprises an annular base 12 and upstream and downstream radial fastening tabs, respectively 14 and 16. The terms "upstream" and "downstream" are used here with reference to the direction of flow of the gas flow in the turbine shown by the arrow F in FIG. 1. The tabs of the ring sector 10 could have another shape, the cross section of the ring sector having a shape other than π, such as for example a K- or O-shape.

The annular base 12 includes, in the radial direction $D_R$ of the ring 1, an internal face 12a and an external face 12b opposite to one another. The internal face 12a of the annular base 12 is coated with a layer 13 of abradable material to define a gas flow stream in the turbine. The terms "internal" and "external" are used here with reference to the radial direction $D_R$ in the turbine.

The upstream and downstream radial fastening tabs 14 and 16 protrude in the direction $D_R$, from the external face 12b of the annular base at a distance from the upstream and downstream ends 121 and 122 of the annular base 12. The upstream and downstream radial fastening tabs 14 and 16 extend over the entire width of the ring sector 10, i.e. over the entire circular arc described by the ring sector 10, or over the entire circumferential length of the ring sector 10.

In FIGS. 1 and 2 the turbine ring 1 portion shown comprises a complete ring sector 10 surrounded by two ring half-sectors 10. For better understanding, the complete ring sector is labeled 10a and the ring half-sectors are labeled 10b in FIG. 2.

As illustrated in FIGS. 1 to 3, the ring support structure 3, which is integral with a turbine casing, comprises a central shroud 31, extending in the axial direction $D_A$, and having an axis of revolution congruent with the axis of revolution of the turbine ring 1 when they are attached together, as well as a first annular radial flange 32 and a second annular radial flange 36, the first annular radial flange 32 being positioned upstream of the second annular radial flange 36, which is therefore located downstream of the first annular radial flange 32.

The second annular radial flange 36 extends in the circumferential direction $D_C$ of the ring 1 and, in the radial direction $D_R$, from the central shroud 31 toward the center of the ring 1. It comprises a first free end 361 and a second end 362 integral with the central shroud 31. The second annular radial flange 36 includes a first portion 363, a second portion 364, and a third portion 365 comprised between the first portion 363 and the second portion 364. The first portion 363 extends between the first end 361 and the third portion 365, and the second portion 364 extends between the third portion 365 and the second end 362. The first portion 363 of the second annular radial flange 36 is in contact with the downstream radial fastening flange 16. The increased thickness of the elements downstream of the first plate 33, in particular the second radial flange 36, allows reducing the axial leaks of the ring without excessively stressing the ring mechanically, in the case of a curvilinear support.

The first annular radial flange 32 extends, in the circumferential direction $D_C$ of the ring 1 and in the radial direction $D_R$, from the central shroud 31 toward the center of the ring 1. It comprises a first free end 321 and a second end 322 integral with the central shroud 31.

As illustrated in FIGS. 1 to 3, the turbine ring assembly 1 comprises a first annular plate 33 and a second annular plate 34, the two annular plates 33 and 34 being attached removably to the first annular radial flange 32. The first and second annular plates 33 and 34 are positioned upstream of the turbine ring 1 with respect to the flow direction F of the gas flow in the turbine.

The first annular plate 33 is positioned downstream of the second annular plate 34. The first annular plate 33 is in a single piece while the second annular plate 34 can be sectorized into a plurality of annular sectors 34' of the second plate 34 or be in a single piece.

The first annular plate 33 has a first free end 331 and a second end 332 attached removably to the ring support structure 3, and more particularly to the first annular radial flange 32. In addition, the first annular plate 33 has a first portion 333 and a second portion 334, the first portion 333 extending between the first end 331 and the second portion 334, and the second portion 334 extending between the first portion 333 and the second end 332.

The second annular plate 34 has a first free end 341 and a second end 342 opposite to the first end 341 and in contact with the central crown 31. The second end 341 of the second annular plate 34 is also attached removably to the ring support structure 3, and more particularly to the first annular radial flange 32. The second annular plate 34 further comprises a first portion 343 and a second portion 344, the first portion 343 extending between the first end 341 and the second portion 344, and the second portion 344 extending between the first portion 343 and the second end 342. The second annular plate 34 also comprises an upstream face 348 and a downstream face 349 opposite to the upstream face 348, each of the upstream and downstream faces 348 and 349 extending in the planes comprising the radial direction $D_R$ and the circumferential direction $D_C$ of the ring 1.

When the ring assembly 1 is assembled, the first portion 333 of the first annular plate 33 is located supported against the upstream radial fastening tab 14 of each of the ring sectors 10 composing the turbine ring 1, and the second portion 334 of the first annular plate 34 is located supported against at least one portion of the first annular radial flange 32.

The first and second annular flanges 33 and 34 are formed to have the first portions 333 and 343 distant from one another and the second portions 334 and 344 in contact, the two plates 33 and 34 being attached removably to the upstream annular radial flange 32 by means of screws 60 and attachment nuts 61, the screws 60 passing through the openings 3340, 3440 and 320 provided respectively in the second portions 334 and 344 of the two annular plates 33 and 34, as well as in the upstream annular radial flange 32.

The second annular plate 34 is dedicated to taking on the force of the high-pressure guide nozzle (DHP) on the ring assembly 1 by making this force pass through the casing line which is mechanically more robust, i.e. toward the line of the ring support structure 3 as illustrated by the force arrows E shown in FIG. 3. The residual force, which passes through the first upstream plate 33, is reduced because the first portion 333 of the first upstream plate 33 has a reduced cross section, and is therefore more flexible, which allows applying a minimum of force on the CMC ring 1.

Figure 4:
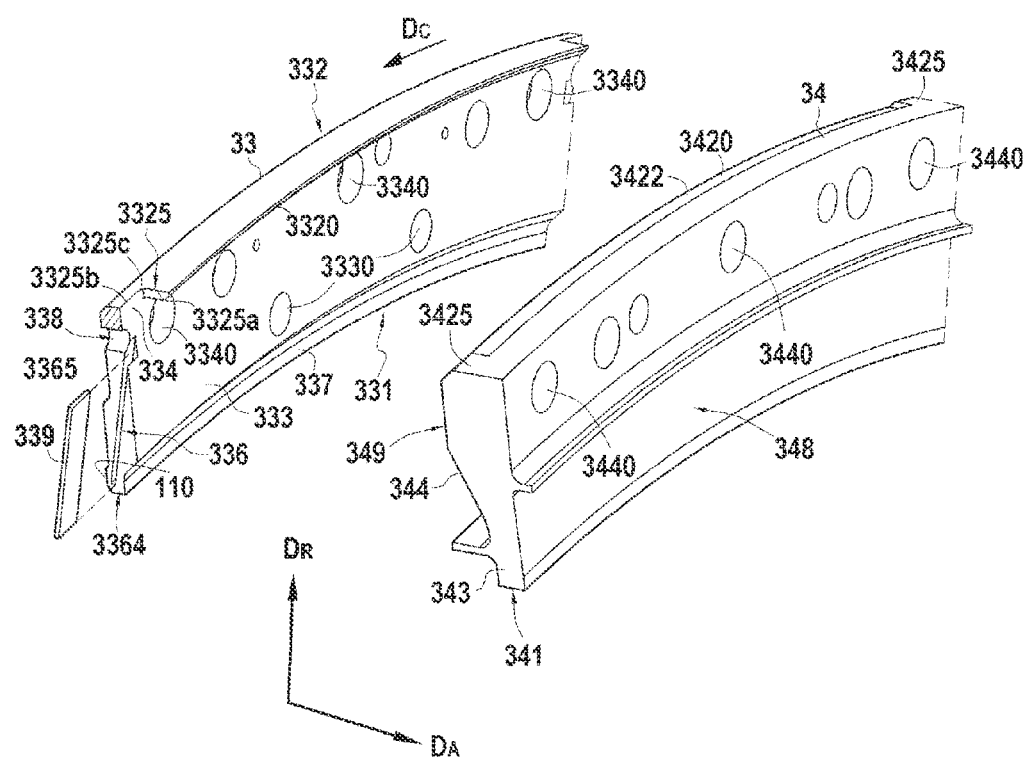
FIG. 4 is a schematic section view of the first upstream annular plate of FIG. 1.

Illustrated in FIG. 4 is a schematic section view of the first upstream annular plate of FIG. 1 in a section plane comprising the radial direction $D_R$ and the axial direction $D_A$ and passing through a radial slot 336 of the first annular plate 33.

As illustrated in FIG. 4, the first portion 333 of the first annular plate 33 has a plurality of radial slots 336 extending from the first end 331. The radial slots 336 have a first end 3361 and a second end 3362 opposite to the first end 3361, the first end 3361 being in the interior of the second end 3362 in the radial direction $D_R$. The first ends 3361 of the radial slots 36 are open on the first end 331 of the first annular plate 33. Each radial slot 336 has a first and a second surface 3364, parallel in the radial direction $D_R$ and in the axial direction $D_A$, the distance between the first and the second surface 3364, which corresponds to the tangential thickness of the slots, can be comprised between 0.1 mm and 5 mm. The radial length of the slots can be comprised between 10 and 90% of the complete radial length of the upstream plate. A small radial slot length favors the reduction of leaks, but degrades the accommodation capacity of sectors of the plate with regard to the ring sectors. A large radial slot length favors the accommodation of the sectors of the plate with regard to the ring sectors but increases the level of leakage.

Each pair of adjacent radial slots 336 thus delimits, between the two adjacent radial slots 336, a first portion sector 337 of the first annular plate 33. Each first portion sector 337 has a ring sector shape, i.e. a solid formed by two concentric circular arcs with different radii and two line segments each corresponding to a segment of the radius of the large circular arc, comprised between the small circular arc and the large circular arc. Each first portion sector 337 is independent of the other first portion sectors 337, given that the radial slots 36 are open at their first end 3361.

The first annular plate 33 further comprises discharge openings 338, and more particularly one discharge opening 338 per radial slot 336. Each discharge opening 338 communicates with the second end 3362 of a radial slot 36. In other words, each discharge opening 338 is made in the first annular plate 33 at the second end 3362 of a radial slot so that the second end 3362 of a radial slot is open to the corresponding discharge opening 338.

In the first embodiment illustrated in FIGS. 1 to 4, the discharge openings 338 are circular openings having a diameter comprised between 0.2 mm and 10 mm.

As illustrated in FIG. 4, the first annular plate 33 further comprises and inter-sector seal 339 for each radial slot 336.

Each radial slot 336 has a first and a second surface 3364 on either side of the radial slot 336. FIG. 4 being a section made through a radial slot 336, only one surface 3364 of radial slot 336 is shown. The first and second surfaces 3364 of a radial slot 336 are parallel, i.e. they are positioned facing one another over the entire radial length of the radial slot 336.

The first surface 3364 comprises a first groove 3365 extending mainly in the radial direction $D_R$. Likewise, the second surface comprises a second groove extending mainly in the radial direction $D_R$. The second groove extends facing the first groove 3365 symmetrically with the first groove 3365 with respect to the section plane VI-VI.

Each of the first and second grooves 3365 of a radial slot 336 are formed to receive an inter-sector seal 339, or sealing strip. The inter-sector seal thus allows ensuring sealing between the first portion sectors 333 of the first annular plate 33.

In addition, as illustrated in FIGS. 1 to 4 the first plate 33 comprises an annular shoulder 3320 protruding upstream in the axial direction $D_A$ from the second end 332 of the first plate 33, as well as, for each radial slot 336 of the first plate 33, a notch 3325 made in the shoulder 3320. Each notch 3325 extends in a plane which comprises the circumferential direction $D_C$ and the axial direction $D_A$ of the ring and which cuts a plane comprising the axial direction $D_A$ and the radial direction $D_R$ and crosses the radial slot 336.

The second plate 34 comprises an annular reinforcement 3420 which corresponds to a complementary annular shoulder of the annular shoulder 3320 of the first plate 33. In other words, the annular reinforcement 3420 forms an axial abutment configured to cooperate with said shoulder 3320 in the axial direction $D_A$.

The annular reinforcement 3420 of the second plate 34 is produced on the corner formed at the junction between the second end 342 and the downstream face of the second plate 34 from a plurality of reinforcing segments 3422, the segments being aligned successively in the circumferential direction $D_C$ to form the annular reinforcement 3420.

The double shoulder provided between the two annular plate 33 and 34 and formed by a shoulder 332o of the first annular plate 33 and the reinforcement 3420 of the second annular plate 34 allows limiting the thermal ramp problems between the two metallic annular plates 33 and 34.

The second plate 34 comprises a plurality of radial centering lugs 3425 extending from the reinforcement 3420 protruding downstream in the radial direction $D_R$ and in the axial direction $D_A$. In the embodiment illustrated in FIGS. 1 to 4, the second plate 34 comprises as many radial centering lugs 3425 as the number of notches 3320 that the first plate 33 comprises.

Two reinforcing segments 3422 adjacent to the second plate 34 are separated by a radial centering lug 3425. Each radial centering lug 3425 forms an abutment in a circumferential direction $D_C$ of the ring and is formed to cooperate with a notch 3325 of the first plate 33 in the circumferential direction $D_C$.

Each notch 3325 comprises, in a plane comprising the circumferential direction $D_C$ and the axial direction $D_A$ of the ring, two parallel lateral walls 3325a extending in the axial direction $D_A$ and a back wall 3325b extending in the circumferential direction $D_C$ between the two lateral walls 3325a. Each of the lateral walls 3325a of a notch is connected to the back wall 3325b by describing an arc 3325c having a radius of curvature greater than or equal to 0.2 mm.

In the axial direction $D_A$, the downstream annular radial flange 36 of the ring support structure 3 is separated from the first upstream annular flange 33 by a distance corresponding to the separation of the upstream and downstream radial fastening tabs 14 and 16 so as to hold the latter between the downstream annular radial flange 36 and the first upstream plate 33.

To retain in position, the ring sectors 10, and therefore the turbine ring 1, with the ring support structure 3, the ring assembly comprises, for each ring sector 10, two first pins 119 cooperating with the upstream fastening tab 14 and the first annular plate 33, and two second pins 120 cooperating with the downstream fastening pin 16 and the second annular radial flange 36.

For each corresponding ring sector 10, the first portion 333 of the first annular plate 33 comprises two openings 3330 for receiving the two first pins 119, and the third portion 365 of the annular radial flange 36 comprises two openings 3650 configured to receive the two second pins 120.

For each ring sector 10, each of the upstream and downstream radial fastening tabs 14 and 16 comprises a first end, 141 and 161, integral with the external face 12b of the annular base 12 and a second free end, 142 and 162. The second end 142 of the upstream fastening tab 14 comprises two first ears 17 each including an opening 170 configured to receive a first pin 119. Similarly, the second end 162 of the downstream radial fastening tab 16 comprises two second ears 18 each including an opening 180 configured to receive a second pin 120. The first and second ears 17 and 18 protrude in the radial direction $D_R$ of the turbine ring 1, respectively of the second end 142 of the upstream radial fastening tab 14 and of the second end 162 of the downstream radial fastening tab 16.

The openings 170 and 180 can be circular or oblong. Preferably, the set of openings 170 and 180 comprises a portion of circular openings and a portion of oblong openings. The circular openings allow tangentially indexing the rings and preventing them from being able to move tangentially (particularly in the event of brushing by the blade). The oblong openings allow accommodating differential dilations between CMC and metal. CMC has a dilation coefficient less than that of metal. When hot, the lengths in the tangential direction of the ring sector and of the facing casing portion will therefore be different. If there were only circular openings, the metal casing would impose its displacements on the CMC ring, which should be a source of high mechanical stresses in the ring sector. Having oblong holes in the ring assembly allows the pin to slide in this hole and avoid the over-stressing phenomenon mentioned above. Therefore, two drilling schemes can be imagined: a first drilling scheme, for a case with three ears, would comprise one circular opening on a radial fastening flange and two tangential oblong openings on the other radial fastening flange, and a second drilling scheme, for a case with at least four ears, would comprise one circular opening and one oblong opening per facing radial fastening flange in each case. Other supplementary cases can also be contemplated.

For each ring sector 10, the two first ears 17 are positioned at two different angular positions with respect to the axis of revolution of the turbine ring 1. Likewise, for each ring sector 10, the two second ears 18 are positioned at two different angular positions with respect to the axis of revolution of the turbine ring 1.

For each ring sector 10, the first annular plate 33 and the second radial annular plate 36 further comprise support surfaces 110 mounted on the faces of the first annular plate 33 and of the second annular radial flange 36 in contact, respectively, with the upstream radial fastening tab 14 and the downstream radial fastening tab 16, i.e. on the downstream face of the first annular plate 33 and on the upstream face of the second annular radial flange 36. The support surfaces 110 can be curvilinear, i.e. extending in the circumferential direction $D_C$, or rectilinear, i.e. extending along a tangent to the circumferential direction $D_C$ at a point of the ring sector 10.

The support surfaces 110 are located below the openings 3330 for receiving the two first pins 119, i.e. in the interior of the openings 3330 in the radial direction.

In one variant, the support surfaces could be mounted on the faces of the upstream and downstream radial fastening tabs 14 and 16 in contact, respectively, with the first upstream annular plate 33 and the downstream annular radial flange 36.

The radial retention of the ring 1 is provided by the first annular plate 33 which is pressed on the first annular radial flange 32 of the ring support structure 3 and on the upstream radial fastening tab 14. The first annular plate 33 provides sealing between the stream cavity and the out-of-stream cavity of the ring.

The second annular plate 34 provided the link between the downstream portion of the DHP, the ring support structure 3, or casing, by radial surface contact, and the first annular plate 33 by axial surface contact.

The ring support structure 3 further comprises radial pins 38 which allow pressing the ring in the lower radial position, i.e. toward the stream, deterministically. There is in fact a clearance between the axial pins and the bores on the ring to compensate for the differential dilation between the metal and the CMC elements which occurs when hot. The radial pins 38 cooperate with openings 380 made in the radial direction $D_R$ in the central crown 31 of the ring support structure 3.

Figure 6:
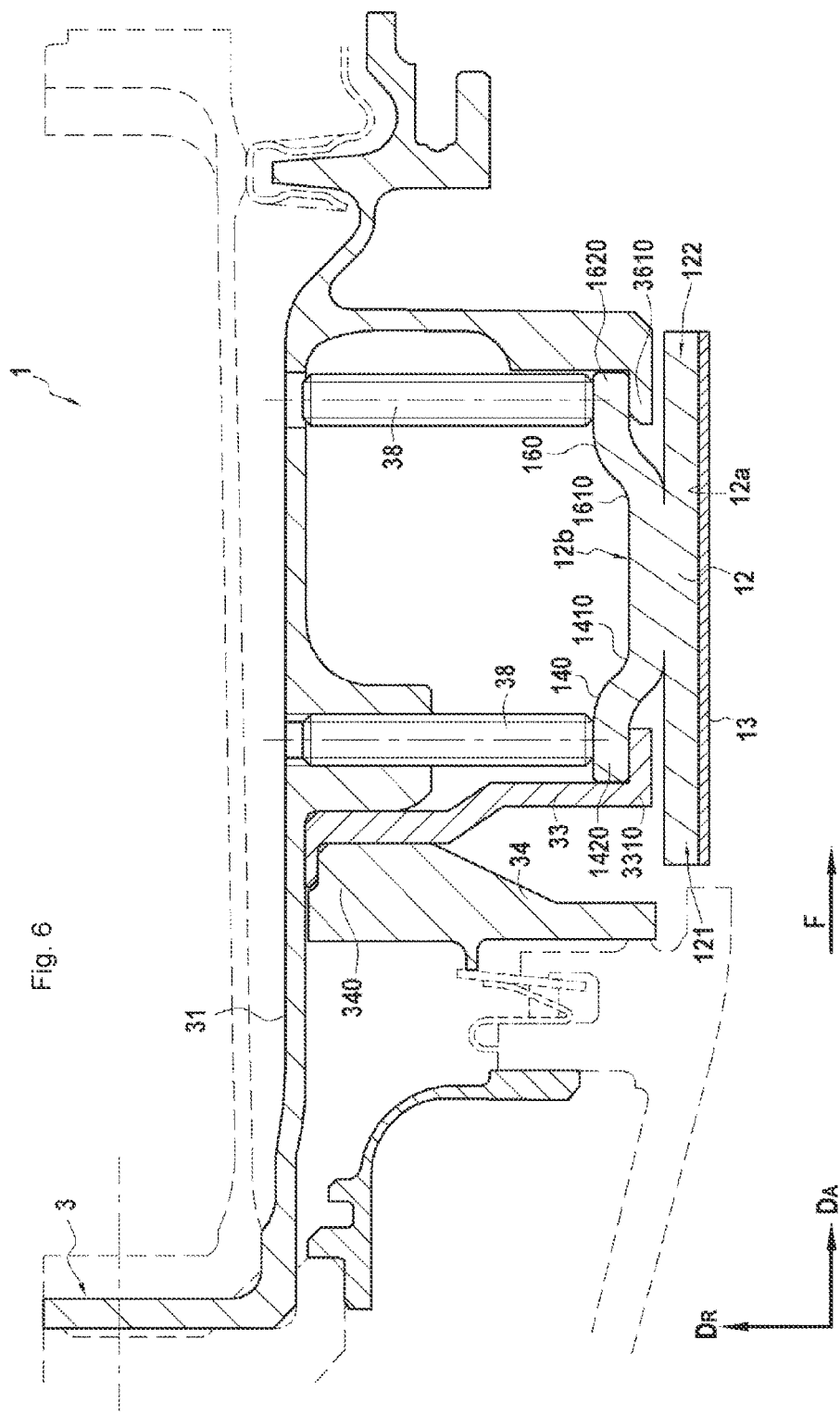
FIG. 6 is a schematic section view of a second embodiment of the turbine ring assembly.

Shown in FIG. 6 is a schematic section view of a second embodiment of the turbine ring assembly.

The second embodiment illustrated in FIG. 6 differs from the first embodiment illustrated in FIGS. 1 to 4, in that the ring sector 10 has, in the plane defined by the axial $D_A$ and radial $D_R$ directions, a K-shaped cross section comprising an annular base 12 with, in the radial direction $D_R$ of the ring, an internal face 12a coated with a layer 13 of abradable material forming a thermal and environmental barrier and which defines the flow stream of gas flow in the turbine. Radial upstream and downstream fastening tabs 140, 160, substantially S shaped, extend in the radial direction $D_R$, from the external face 12b of the annular base 12 over the latter's entire length and above the upstream and downstream circumferential end portions 121 and 122 of the annular base 12.

The radial fastening tabs 140 and 160 have a first end, respectively labeled 1410 and 1610, integral with the annular base 12, and a second free end, labeled respectively 1420 and 1620. The free ends 1420 and 1620 of the upstream and downstream radial fastening tabs 140 and 160 extend either parallel to the plane in which the annular base 12 extends, i.e. in a circular plane, or rectilinearly, while the fastening tabs 140 and 160 extend in an annular manner. In this second configuration where the ends are rectilinear and the fastening tabs annular, in the case of a possible tilting of the ring during operation, the surface supports then become linear supports, which offers greater sealing than in the case of point supports. The second end 1620 of the radial fastening tab 160 is retained between a portion 3610 of the second annular radial flange 26 protruding in the axial direction $D_A$ from the first end 361 of the second annular radial flange 36 in the opposite direction to the flow F direction and the free end of the associated screw 38, i.e. the screw opposite to the screw head. The second end 1410 of the upstream radial fastening tab 140 is retained between a portion 3310 of the first annular plate 33 protruding in the axial direction $D_A$ from the first end 331 of the first annular plate 33 in the direction of the flow F, and the free end of the associated screw 38.

Figure 7:
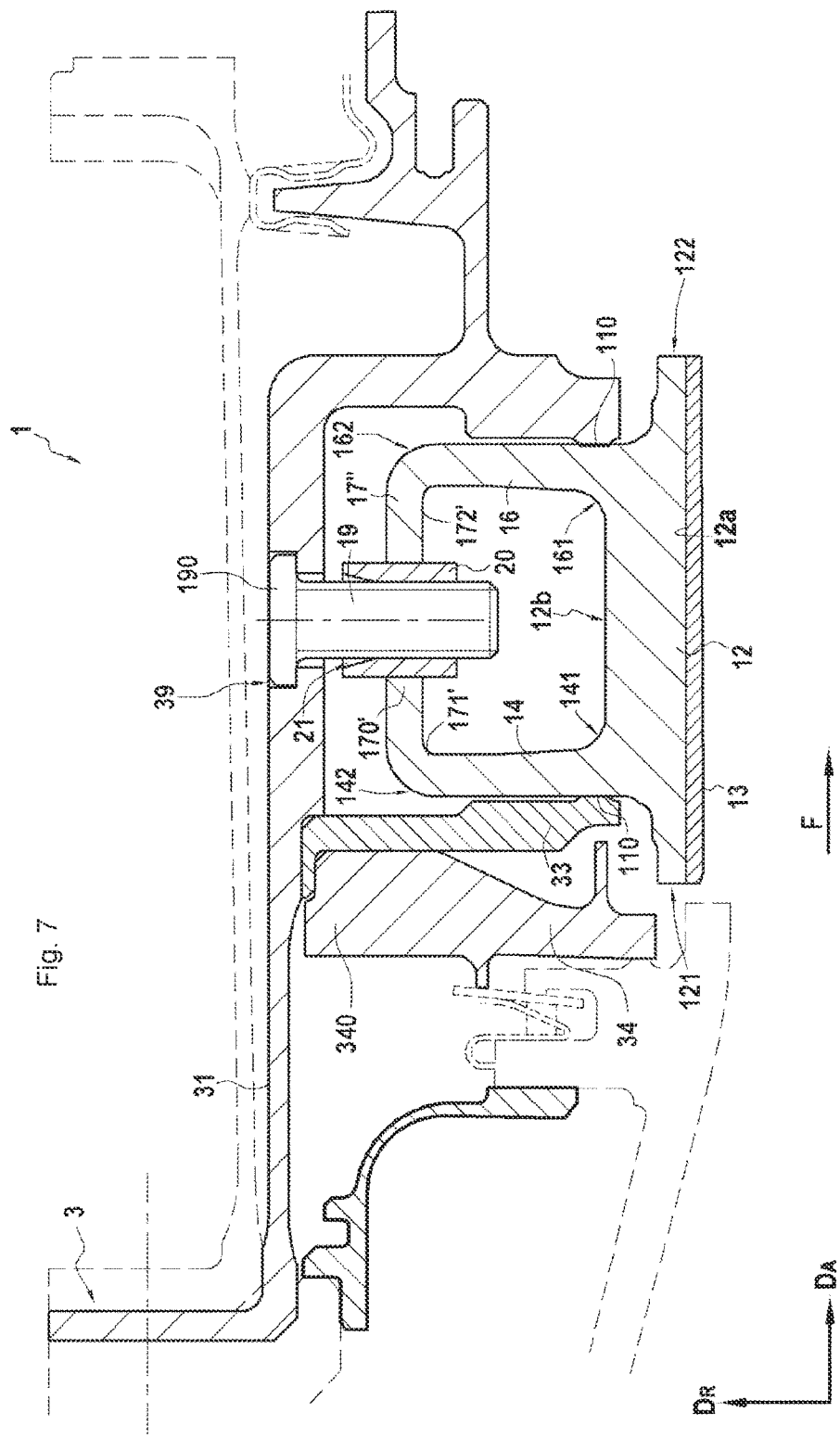
FIG. 7 shows a schematic section view of a third embodiment of the turbine ring assembly.

In FIG. 7 is shown a schematic section view of a third embodiment of the turbine ring assembly.

Figure 8:
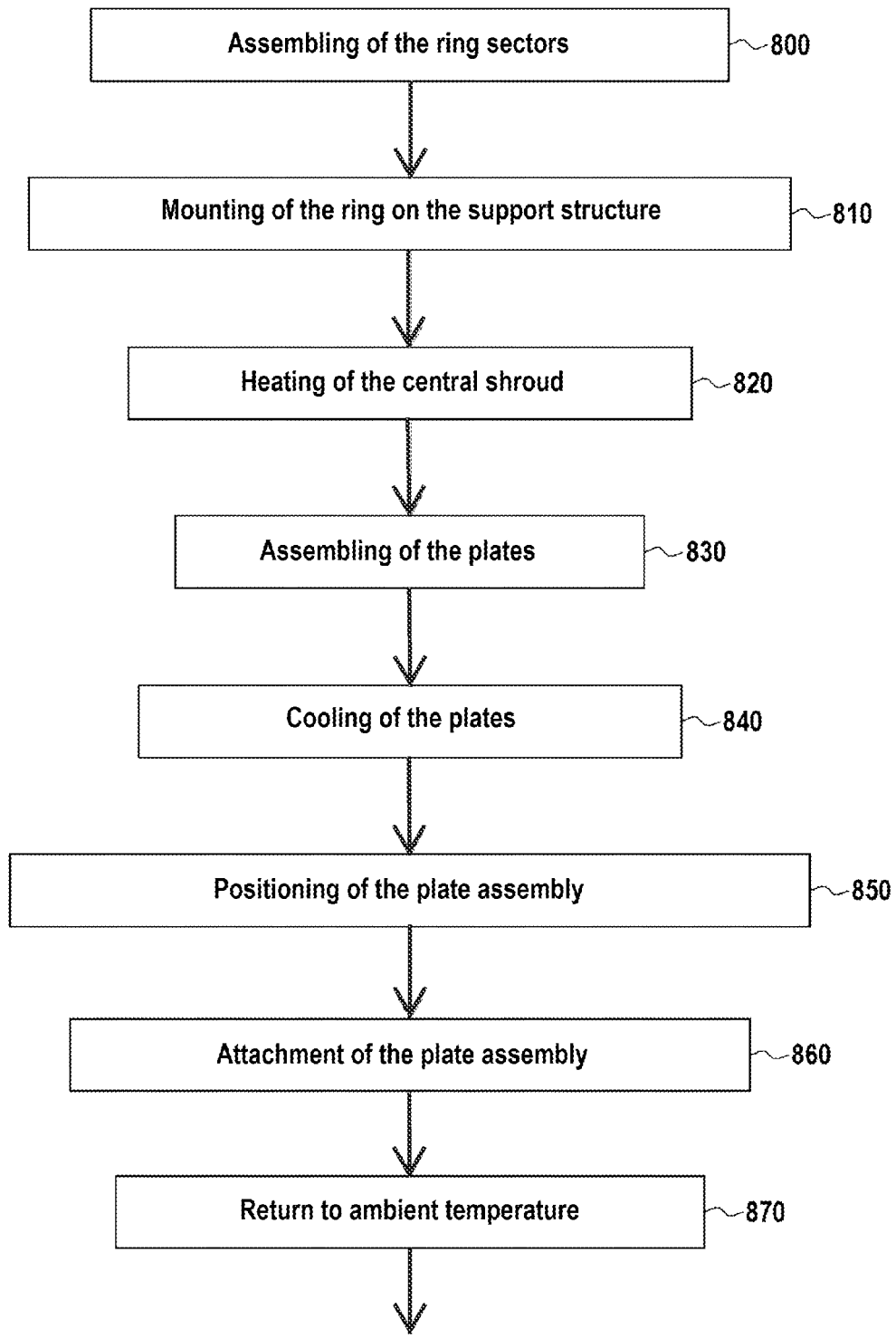
FIG. 8 shows a flowchart of a method for assembling the turbine ring assembly according to the invention according to one mode of implementation.

The third embodiment illustrated in FIG. 8 differs from the first embodiment illustrated in FIGS. 1 to 4 in that the ring sector 10 has, in the plane defined by the axial $D_A$ and radial $D_R$ directions, over a portion of the ring sector 10, an O-shaped cross section instead of a cross section shaped like an inverted π, the ring section 10 being attached to the ring support structure 3 by means of a screw 19 and an attachment part 20, the screws 38 being eliminated.

In the third embodiment illustrated in FIG. 7, the ring sector 10 comprises an axial fastening tab 17' extending between the upstream and downstream radial attachment tabs 14 and 16. More precisely, the axial fastening tab 17' extends in the axial direction $D_A$, between the second end 142 of the upstream radial fastening tab 14 and the second end 162 of the downstream radial attachment tab 16.

The axial fastening tab 17' comprises and upstream end 171' and a downstream end 172' separated by a central portion 170'. The upstream and downstream ends 171' and 172' of the axial fastening tab 17' protrude in the radial direction $D_R$, from the second end 142, 162 of the radial fastening tab 14, 16 to which they are coupled, so as to have a central portion 170' of the axial fastening tab 17' elevated with respect to the second ends 142 and 162 of the upstream and downstream radial fastening tabs 14 and 16.

For each ring sector 10, the turbine ring assembly comprises a screw 19 and an attachment part 20. The attachment part 20 is attached to the axial fastening tab 17'.

The attachment part 20 further comprises an opening equipped with tapping cooperating with a screw thread 19 to attach the attachment part 20 to the screw 19. The screw 19 comprises a screw head 190 the diameter of which is greater than the diameter of an opening 39 made in the central shroud 31 of the ring support structure 3 through which the screw 19 is inserted before being screwed to the attachment part 20.

The radial integration of the ring sector 10 with the ring support structure 3 is accomplished by means of the screw 19, the head 190 of which is supported on the central crown 31 of the ring support structure 3, and of the attachment part 20 screwed to the screw 19 and attached to the axial fastening tab 17' of the ring sector 10, the screw head 190 and the fastening part 20 exerting forces in opposite directions to hold together the ring 1 and the ring support structure 3.

In one variant, the downward radial retention of the ring can be provided by means of four radial pins pressed on the axial fastening tab 17', the upward radial retention of the ring can be provided by a pick-up head, integral with the screw 19, placed under the ring in the cavity between the axial fastening tab 17' and the external face 12b of the annular base.

In the second and third embodiments illustrated in FIGS. 6 and 7, the second end 342 of the second annular plate 34 comprises a contact abutment 340 protruding in the axial direction $D_A$ between the second annular plate 34 and the first annular plate 33. The contact abutment 340 allows maintaining a distance between the first end 331 of the first annular plate 33 and the first end 341 of the second annular plate 34 during the tilting of the second annular plate 34 induced by the DHP force.

Described now is a method for producing a turbine ring assembly corresponding to that shown in FIG. 1, i.e. according to the first embodiment illustrated in FIGS. 1 to 4.

Each ring sector 10 described earlier is made of ceramic matrix composite (CMC) material by formation of a fibrous preform having a shape similar to that of the ring sector and densification of the ring sector by a ceramic matrix.

For the production of the fibrous preform, it is possible to use ceramic fiber yarns or carbon fiber yarns.

The fibrous preform is advantageously produced by three-dimensional weaving, or multilayer weaving with the provision of detachment zones allowing separating the parts of the preforms corresponding to the fastening tabs 14 and 16 of the sectors 10.

The weaving can be of the interlock type, as illustrated. Other three-dimensional or multilayer weave patterns can be used, such as for example multi-wire or multi-satin patterns. Document WO 2006/136755 can be referred to.

After weaving, the blank can be formed to obtain a preform of the ring sector which is consolidated and densified by a ceramic matrix, the densification being able to be accomplished in particular by chemical vapor infiltration (CVI), which is well known per se. In one variant, the textile preform can be slightly hardened by CVI so that it is sufficiently rigid to be handled, before having liquid silicon rise by capillarity into the textile to cause densification ("Melt Infiltration").

A detailed example of CMC ring sector manufacture is described in particular in document US 2012/0027572.

The ring support structure 3, for its part, is made of a metallic material such as a nickel-, cobalt- or titanium-based alloy.

The production of the turbine ring assembly continues with the mounting of the ring sectors 10 on the ring support structure 3.

FIG. 8 shows a flowchart of a method for assembling the turbine ring assembly according to the invention according to one mode of implementation.

In a first step 800, the ring sectors 10 are assembled together on an annular tool of the "spider" type including, for example, suction cups configured so that each holds one ring sector 10.

Then the two second pins 120 are inserted into the two openings 3650 provided in the third portion 365 of the second annular radial flange 36 of the ring support structure 3.

The ring 1 is then mounted, in a following step 810, on the ring support structure 3 by inserting each second pin 120 into each of the openings 180 of the second ears 18 of the downstream radial fastening tabs 16 of each ring sector 10 composing the ring 1.

All the first pins 119 are then placed in the openings 170 provided in the first ears 17 of the radial fastening tab 14 of the ring 1.

In a following step 820, the radially external surface of the central shroud 31 of the ring support structure 3 is surrounded by a heating blanket, and the central shroud is heated to radially dilate the central shroud sufficiently for the insertion of the annular plates 33 and 34.

Then, prior to the mounting of the first and second plate 33 and 34 to the ring support structure 3, in a step 830 which can be carried out during at least one of the preceding steps 800 to 810, the second annular plate 34 is heated to dilate it radially and the first annular plate 33 is cooled to shrink it radially. Then the second annular plate 34 is positioned against the first annular plate 33 by inserting the radial centering lugs 3425 of the second annular plate 34 into each of the notches 3325 of the first annular plate 33, and the two annular plates 33 and 34 are shrink-fit to one another by letting the two plates return to ambient temperature, or by bringing both plates to the same temperature.

Once the two plates are assembled together, in a following step 840 which can be carried out during at least one of the preceding steps 800 to 810, the assembly formed by the first annular plate 33 and the second annular plate 34 is cooled by applying dry ice to the assembly in order to obtain shrinkage of the parts.

Then, in a following step 850, the cooled assembly of the two plates 33 and 34 is positioned on the ring support structure 3, by placing the second portion 334 of the first annular plate 33 supported against the first radial flange and the support surfaces 110 of the first portion 333 of the first annular plate 33 supported against the first fastening tab 14 by adjusting the first annular plate 33 so that the first pins 117 are inserted into the openings 3330 of the first portion 333 of the first annular plate 33.

Then, to attach the two upstream plates 33 and 34 together to the ring support structure 3, in a following step 860, the screws 60 are inserted into the coaxial openings 3440, 3340 and 320, provided in the second portion 344 of the second upstream plate 34, in the second portion 334 of the first plate and in the upstream annular radial flange 32, and each of the screws 60 is clamped by means of a nut 61.

Then, in a final step 870, the heating blanket is withdrawn from the central shroud 31 to that it retracts and thus obtains the shrink fit of the first and second annular plates 33 and 34 on the central shroud 31 of the ring support structure 3.

The dry ice can be withdrawn from the plates 33 and 34 after their mounting on the ring, or during step 860.

The ring 1 is thus held in position axially by means of the first annular plate 33 and of the second annular radial flange 36 supported respectively upstream and downstream on their respective support surface 110. During the installation of the first annular plate 33, an axial preload can be applied to the first annular plate 33 and to the radial fastening tab 14 to mitigate the effect of the differential dilation between the CMC material of the ring 1 and the metal of the ring support structure 3. The first annular plate 33 is held in axial stress by mechanical elements placed upstream, as illustrated in dotted lines in FIGS. 6 and 7.

The ring 1 is held in position radially by means of first and second pins 119 and 120 cooperating with the first and second ears 17 and 18 and the openings 3340 and 3650 of the first annular plate 33 and of the annular radial flange 36.

Figure 9:
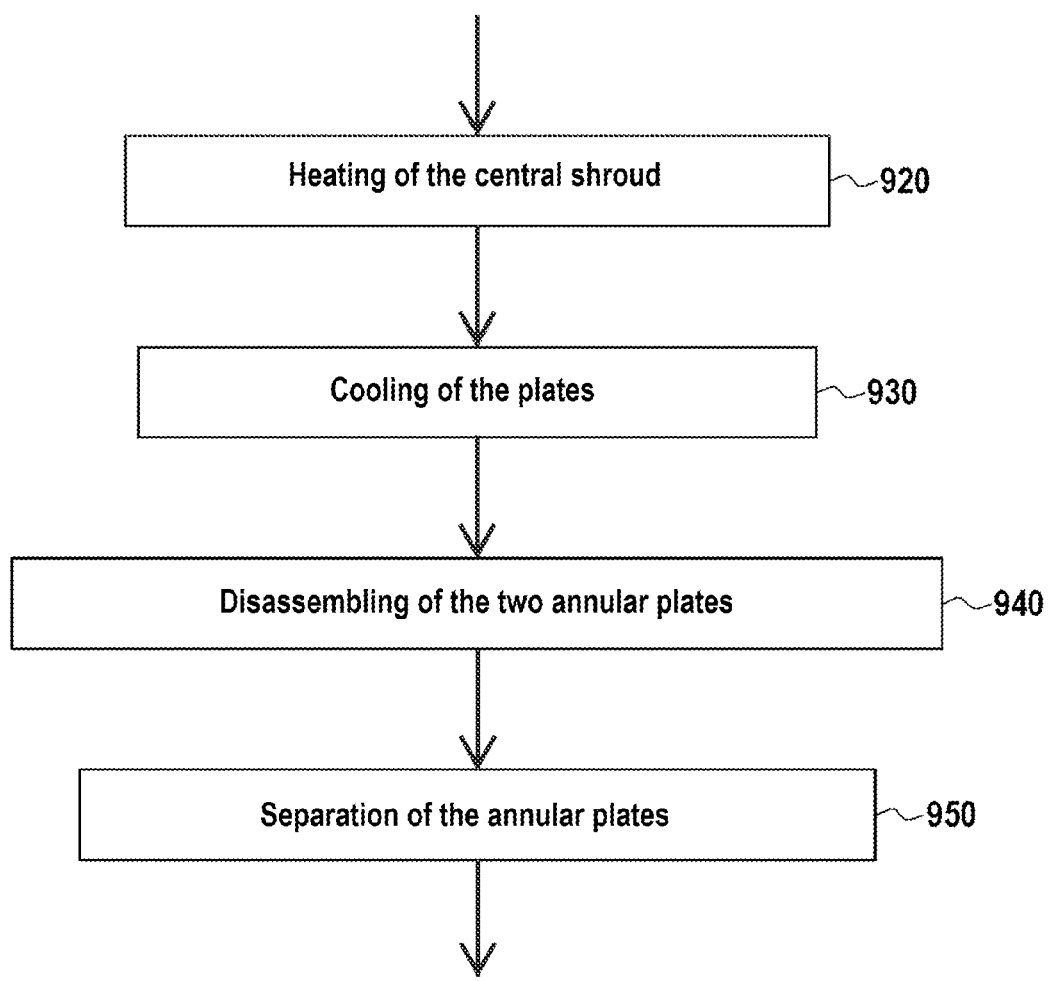
FIG. 9 shows a flowchart of a method for disassembling the turbine ring assembly according to the invention according to one mode of implementation.

FIG. 9 shows a flowchart of a method for disassembling the turbine ring assembly according to the invention according to one embodiment. The disassembling of the turbine ring assembly can be accomplished for example within the scope of a maintenance operation of the annular plates 33 and 34, or of the ring.

In a first step 920, the radially external surface of the central shroud 31 of the ring support structure 3 of a heating blanket and the central shell is heated to radially dilate the central shroud 31.

In a step 930 carried out simultaneously with step 920, the first annular plate 33 and the second annular plate 34 are cooled by applying dry ice on top of each one in order to obtain shrinkage of the parts.

Figure 5:
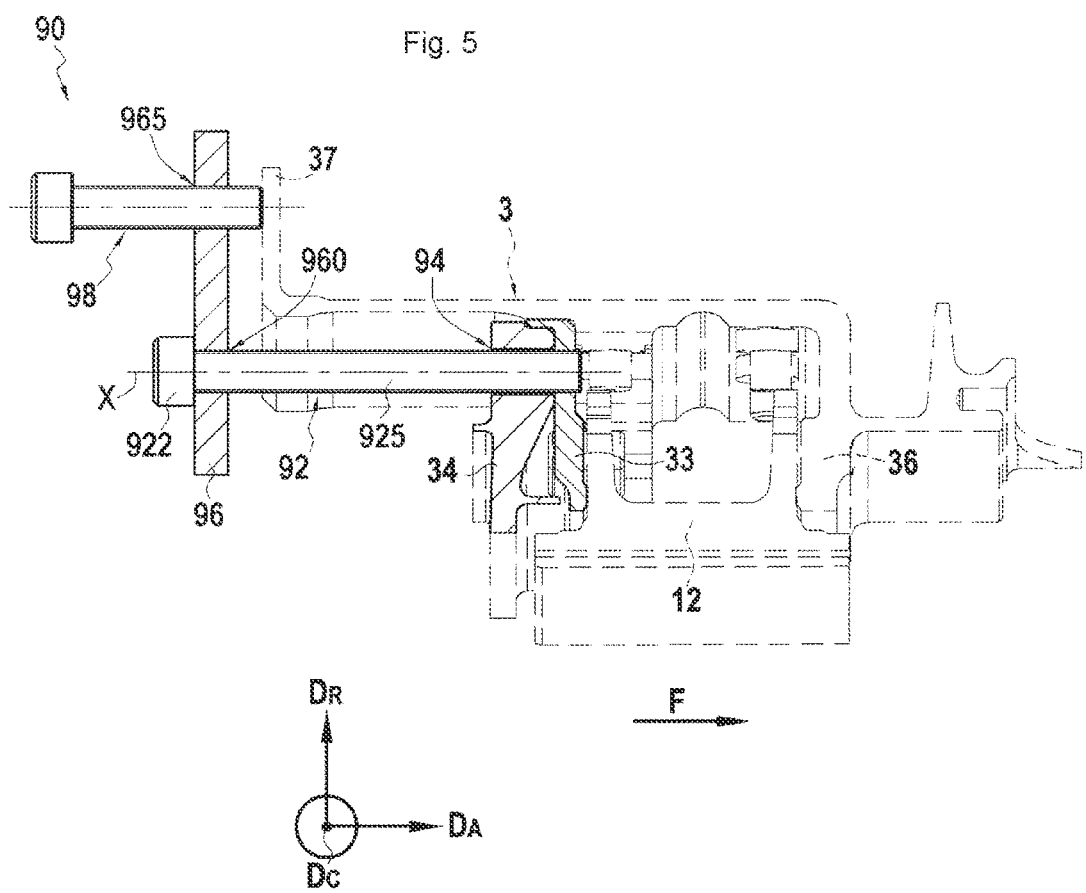
FIG. 5 shows a schematic section view of the turbine ring assembly of FIG. 1 during the disassembling of the annular plates.

Then, in a following step 940, the first plate 33 and the second plate 34 are extracted together from the ring support structure 3 by means of an extraction tool 90. In FIG. 5, a section view of the turbine ring assembly of FIG. 1 is illustrated schematically during the disassembling of the annular plates 33 and 34 by means of the extraction tool 90.

As illustrated in FIG. 5, a plurality of first fine-pitch screws 92 is attached into the first tapped openings 94 passing through both the second plate 34 and the first plate 33 along the same axis. The first screws 92 are integral with an extraction plate 96, the head 922 of the first screws 92 being pressed against the extraction plate 96, and the rod 925 of the first screw 92 passing through the extraction plate 96 via second untapped openings 960 made in the extraction plate 96. Second screws 98 are then placed supported against a portion 37 of the ring support structure 3 distinct from the second plate 34 and extending in a radial plane orthogonal to the axial direction $D_A$. The second screws 98 are engaged with third tapped openings 965 made in the extraction plate 96. The second screws 98 are then activated to separate the extraction plate 96 from the ring support structure 3 and extract the two plates 33 and 34 from the ring support structure 3.

As illustrated in FIG. 9, in a following step 950, the first annular plate 33 is then separated from the second annular plate.

The invention thus supplies a turbine ring assembly allowing the retention of each ring sector deterministically while allowing, on the none hand, the ring sector and by extension the ring to deform under the influence of temperature increases and pressure variations, this in particular independently of the metallic interface parts and, on the other hand, while improving the sealing between the stream sector and the out-of-stream sector, particularly the sealing of the cavity located at the radially exterior portion at the exterior of the ring. All this while simplifying manipulations and reducing their number for the assembling and disassembling the ring assembly.

The invention further supplies a turbine ring assembly equipped with an upstream plate allowing, on the one hand, providing optimal sealing of the cavity defined by the ring and, on the other hand, effectively accommodating the different axial lengths of each CMC ring sector which composes the ring crown. In other words, for this second point, the contact between the upstream portion of the ring and the upstream plate must be effective for each ring sector, although they have different lengths, these lengths being in fact impacted by manufacturing tolerances.

The invention claimed is:

1. A method for assembling a turbine ring assembly comprising a turbine ring of ceramic matrix composite material and a ring support structure of metal equipped with a central shroud from which protrude a first and a second radial flange from which the ring is held, and with at least one single-piece annular plate positioned upstream of the turbine ring and of the first radial flange with respect to the direction of an air flow intended to pass through the turbine ring assembly, said at least one annular plate having, in the radial direction, a first free end and a second end opposite to the first end, said second end being, on the one hand, removably attached to said first radial flange and, on the other hand, shrink-fit to the central shroud of the ring support structure, wherein the method for assembling comprises, prior to the assembling of the at least one annular plate to the central shroud of the ring support structure, a step of radial deformation of the ring support structure by heating the central shroud via an application of a heating blanket surrounding the entire circumferential perimeter of the radially external surface of the central shroud, then a step of insertion of said at least one plate on the ring support structure.

2. The method for assembling according to claim 1, wherein the heating step is maintained until the temperature of the central shroud is greater than or equal to 30° C.

3. The method for assembling according to claim 1, further comprising, prior to the assembling of said at least one annular plate to the ring support structure, a step of cooling said at least one annular plate in order to obtain a shrinkage of said at least one annular plate.

4. The method for assembling according to claim 1, wherein the assembling of the ring assembly is accomplished in the vertical position with respect to the ground, the turbine ring and the ring support structure being positioned with the axial direction of the ring parallel to the vertical direction.

5. A method for disassembling a turbine ring assembly comprising a turbine ring of ceramic matrix composite material and a ring support structure of metal equipped with a central shroud from which protrude a first and a second radial flange from which the ring is held, and of at least one single-piece annular plate positioned upstream of the turbine ring and of the first radial flange with respect to the direction of an air flow intended to pass through the turbine ring, said at least one annular plate having in the radial direction a first free end and a second end opposite to the first end, said second end being, on the one hand, removably attached to said first radial flange and, on the other hand, shrink-fit to the central shroud of the ring support structure, wherein the method for disassembling comprises, prior to the disassembling of said at least one annular plate of the central shroud of the ring support structure, a step of radial deformation of the ring support structure by heating the central shroud via an application of a heating blanket surrounding the entire circumferential perimeter of the radially external surface of the central shroud then a step of extraction of said at least one plate of the ring support structure.

6. The method for disassembling according to claim 5, wherein the heating step is maintained until the temperature of the central shroud is greater than or equal to 50° C.

7. The method for disassembling according to claim 5, further comprising, simultaneously with the step of heating the central shroud, a step of cooling said at least one annular plate.

8. The method for disassembling according to claim 5, in which the cooling step comprises the application of forced convection by means of a fan aimed at said at least one plate.

9. The method for disassembling according to claim 5, wherein the cooling step comprises the application of dry ice on said at least one plate so as to obtain a shrinkage of said at least one plate.

10. The method for disassembling according to claim 5, wherein the step of extraction of said at least one plate comprises attachment of a plurality of first screws into tapped openings of said at least one plate, the first screws being integral with an extraction plate, then the support of second screws against a flange of the ring support structure, the second screws being engaged with the tapped openings of the extraction plate, then the activation of the second screws to move the extraction plate away from the ring support structure so as to extract said at least one plate from the ring support structure.

11. The method for disassembling according to claim 5, wherein the disassembling of the ring assembly is accomplished in the vertical position with respect to the ground, the turbine ring and the ring support structure being positioned with the axial direction of the ring parallel to the vertical direction.

* * * * *